Nov. 27, 1951     C. B. LUTZ     2,576,302
TIRE CHAIN APPLYING CLIP
Filed Sept. 5, 1947
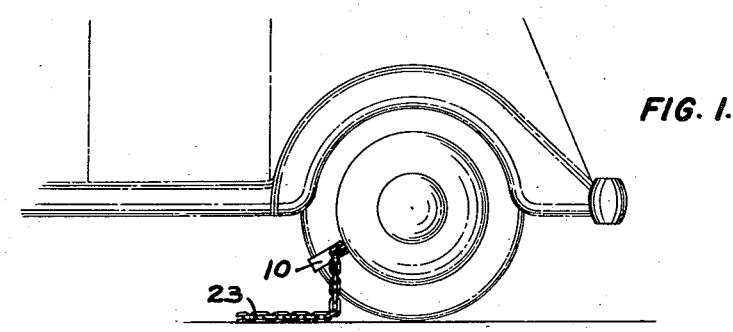
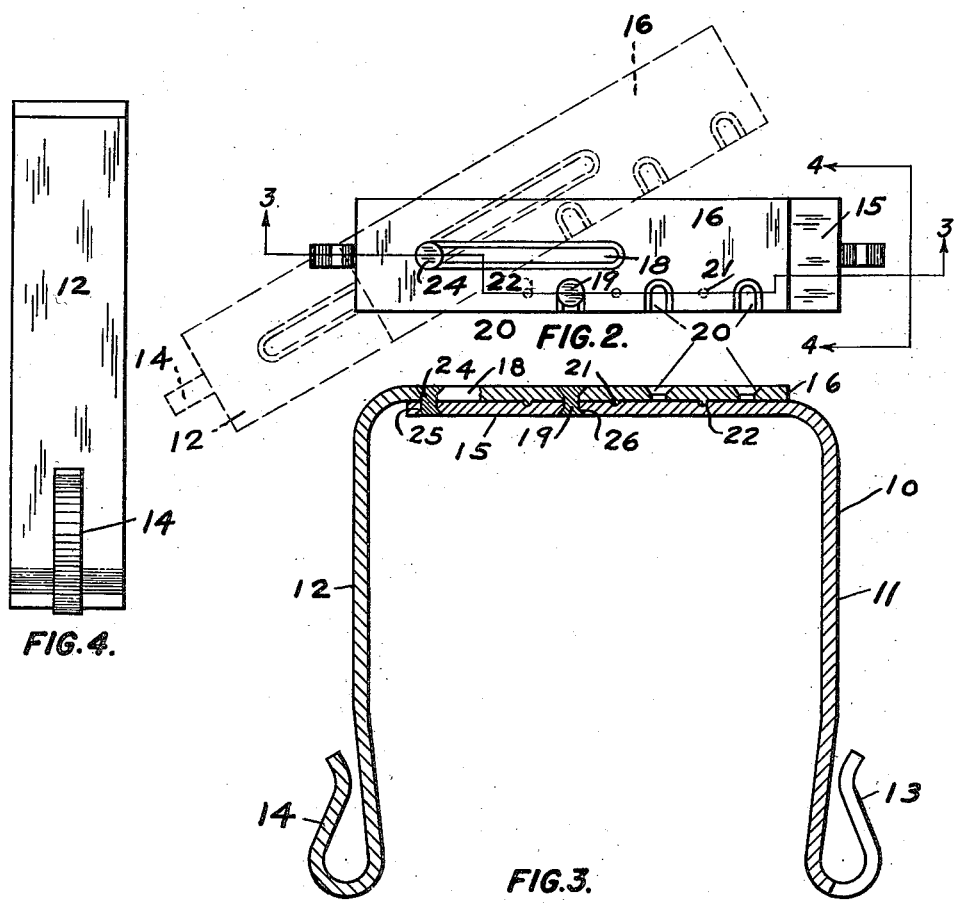
Inventor
CLAY B. LUTZ.
By Howard J. Whelan.
Attorney Patented Nov. 27, 1951

2,576,302

UNITED STATES PATENT OFFICE 2,576,302

TIRE CHAIN APPLYING CLIP

Clay B. Lutz, Linthicum Heights, Md.

Application September 5, 1947, Serial No. 772,275

1 Claim. (Cl. 81—15.8)

This invention relates to automobile tire chains and more particularly to a device for applying tire chains to pneumatic tires.

The conventional manner of applying tire chains to pneumatic tires comprises the laying of the chains on the ground, then backing the tire to a position about midway the length of the chain, pulling the ends of the chains and joining them at the top of the tire.

It is an object of this invention to provide a new and improved tire chain applicator that will avoid one or more of the disadvantages and limitations of the prior art.

Another object of the present invention is to provide a new and improved tire applicating device that can be readily adjusted to suit the width of the tire and be locked thereon.

Another object of the present invention is to provide a new and improved tire chain applicating device which can be compressibly attached to a pneumatic tire and pull a tire chain thereon for attachment.

Another object of the present device is to provide a tire chain applicator that will place tire chains on wheels enclosed within the mud guards.

For a better understanding of this invention and for other objects thereof reference is had to the attached drawings and following description, while the scope of the invention is particularly pointed out in the claim.

In the drawings:

Figure 1 is a side view of a wheel and its pneumatic tire, showing the non-slipping chain extended in length toward the ground in the front of the wheel and its rearward end portions connected by the tire applicating device embodying this invention;

Figure 2 is a plan view of the tire applicating device shown in Figure 1, the dotted lines show the outline of the device when it is being applied to a tire;

Figure 3 is a sectional view taken along the line 3—3 of Figure 2, and

Figure 4 is an end view looking in the direction of the lines 4—4 of Figure 2.

Similar reference characters refer to similar parts throughout the drawings.

In the drawings, a tire chain applying device 10, is formed with side pieces 11 and 12 having hook members 13 and 14 respectively attached at their lower ends. The upper end 15 of the side piece 11 is disposed under the upper end 16 attached to the side piece 12 and is pivoted thereon by a pin 24 which works in an elongated slot 18 and prevents the parts from separating from each other. The pin 24 is attached permanently to the upper end 15. A second pin 19 is also attached in a fixed manner to the upper end 15 and engages in a series of slots 20 to hold the applicator in its selected position. Projections 21 align and fit into indentations 22 and assist in preventing the selected slot 20 from slipping off the pin 19 and allowing the side walls 11 and 12 from separating and allowing the applying device to slip off the tire. The tire chains 23 are attached at their ends to the hook members 13 and 14 and are pulled up over the tire and locked thereon.

The tire applying device is preferably assembled by placing the upper ends 15 and 16 against each other and placing the pin 24 in the elongated slot 18 and through the hole 25 and the second pin 19 through the slot 20 and hole 26, the ends of the rivets 19 and 24 are then turned over and the device is ready for use.

In the use of the tire applying device the side piece 12 pressed backward as shown in the dotted outline of Figure 2, and the side pieces pulled apart to allow the device to be slipped over the lower end of the tire. The side pieces are pushed together to bind against the side walls of the tire and the upper ends 15 and 16 are then swung together so the pin 19 will fit into its respective slot 20, and hold the device until it is desired to remove same from the tire. The chain 23 is attached to the hooks 13 and 14 and pulled up over the tire and down to join its other end so they can be locked together.

While but one general form of the invention is shown in the drawings and described in the specifications, it is not desired to limit this application for patent to this particular form or in any other way otherwise than limited by the scope of the claim, as it is appreciated that other forms of construction could be made that would use the same principles and come within the scope of the appended claim.

I claim:

A tire chain mounting device comprising a pair of flat pieces each having a side arm depending at right angles therefrom, said flat pieces being arranged in superposed position and being in frictional contact, the first of said pieces having an elongated slot therethrough, a pin secured to the second piece and guidedly extending through said slot whereby both pieces are pivotable one about the other and the distance between the side arms may be varied by sliding movement of the pin within said slot, a second pin carried by the second of said pieces, the first piece having a series of slots along one edge thereof to receive said second pin and maintain the pieces in selected positions of adjustment, said side arms having their free end terminating in hook elements to which the tire chain is secured, and frictional retaining means between the cooperating faces of the pieces.

CLAY B. LUTZ.

REFERENCES CITED

The following references are of record in the file of this patent:

UNITED STATES PATENTS

| Number | Name | Date |
|---|---|---|
| 551,259 | Calkins | Dec. 10, 1895 |
| 870,510 | Hartridge | Nov. 5, 1907 |
| 1,499,036 | Smith | June 24, 1924 |
| 1,500,409 | Melton et al. | July 8, 1924 |
| 1,941,935 | Erickson | Jan. 2, 1934 |
| 2,046,683 | Harris | July 7, 1936 |
| 2,076,894 | Johnson | Apr. 13, 1937 |
| 2,175,395 | Hewel | Oct. 10, 1939 |
| 2,208,860 | Smart | July 23, 1940 |